US008854776B2

(12) United States Patent
Lim et al.

(10) Patent No.: US 8,854,776 B2
(45) Date of Patent: Oct. 7, 2014

(54) RELAY AND METHOD FOR PROTECTING TRANSFORMER, AND TRANSFORMER PROTECTING SYSTEM HAVING THE SAME

(75) Inventors: Ui Jai Lim, Jeonju (KR); Jong Jin Jung, Cheongju (KR)

(73) Assignee: LSIS Co., Ltd., Anyang-Si, Gyeonggi-Do ( * ) Notice: Subject to any disclaimer, the term of this patent is extended or adjusted under 35 U.S.C. 154(b) by 88 days.

(21) Appl. No.: 13/354,253

(22) Filed: Jan. 19, 2012

(65) Prior Publication Data
US 2012/0194949 A1  Aug. 2, 2012

(30) Foreign Application Priority Data

Jan. 27, 2011 (KR) ........................ 10-2011-0008436

(51) Int. Cl.
*H02H 7/04* (2006.01)
*H02H 7/055* (2006.01)
*H01F 27/40* (2006.01)

(52) U.S. Cl.
CPC ................. *H02H 7/04* (2013.01); *H02H 7/055* (2013.01); *H04H 3/006* (2013.01); *H01F 27/402* (2013.01)
USPC .......................................................... 361/36

(58) Field of Classification Search
USPC .................. 361/35, 36, 38, 39.1, 78
See application file for complete search history.

(56) References Cited

U.S. PATENT DOCUMENTS

| | | | | |
|---|---|---|---|---|
| 2,456,541 A | * | 12/1948 | Stoecklin | 361/36 |
| 3,754,163 A | * | 8/1973 | Sykes | 361/36 |
| 6,958,894 B2 | * | 10/2005 | Kang et al. | 361/38 |
| 2009/0147412 A1 | * | 6/2009 | Kojovic et al. | 361/36 |
| 2011/0161468 A1 | * | 6/2011 | Tuckey et al. | 709/220 |

FOREIGN PATENT DOCUMENTS

| | | | |
|---|---|---|---|
| CN | 1141097 | 1/1997 | |
| JP | 63265518 | 11/1988 | |
| JP | 01-157214 | 6/1989 | |
| JP | 01-157215 | 6/1989 | |
| JP | 9284989 | 10/1997 | |
| JP | 409284989 A | * 10/1997 | ............ H02H 7/045 |
| JP | 11308759 | 11/1999 | |
| JP | 2004-125688 | 4/2004 | |
| JP | 2005-269870 | 9/2005 | |

OTHER PUBLICATIONS

ABB Power Technologies AB: "Differential Protection for Power Transformers with RET 670", SA2007-000029, pp. 1-14, Nov. 2006.
Japan Patent Office Application Serial No. 2012-014088, Office Action dated Jul. 16, 2013, 6 pages.
The State Intellectual Property Office of the People's Republic of China Application Serial No. 201210042729.6, Office Action dated Nov. 22, 2013, 9 pages.

* cited by examiner

*Primary Examiner* — Dharti Patel
(74) *Attorney, Agent, or Firm* — Lee, Hong, Degerman, Kang & Waimey

(57) ABSTRACT

Disclosed are a relay and method for protecting a transformer, and a transformer protecting system having the same. In the present disclosure, whether a transformation ratio of a transformer has been correctly set or not may be determined based on an inner algorithm. If it is determined that the transformation ratio of the transformer has been incorrectly set, a user may be informed to reset the transformation ratio. This may prevent a malfunction of the relay when the system is operated, and may enhance a system stability.

12 Claims, 3 Drawing Sheets

RELAY AND METHOD FOR PROTECTING TRANSFORMER, AND TRANSFORMER PROTECTING SYSTEM HAVING THE SAME

CROSS-REFERENCE TO RELATED APPLICATION

Pursuant to 35 U.S.C. §119(a), this application claims the benefit of earlier filing date and right of priority to Korean Patent Application No. 10-2011-0008436, filed on Jan. 27, 2011, the contents of which is incorporated by reference herein in its entirety.

BACKGROUND OF THE INVENTION

1. Field of the Invention

The present invention relates to a relay and method for protecting a transformer, and more particularly, to a relay and method for protecting a transformer capable of preventing a malfunction occurring when a transformation ratio of a transformer has been incorrectly set, and a transformer protecting system having the same.

2. Background of the Invention

The conventional transformer protecting relay is configured to allow a user to set a transformation ratio of a transformer. That is, a user sets a voltage ratio of the transformer, and a current ratio between a primary current transformer and a secondary current transformer.

This is implemented so as to make different electricity amounts input to the primary current transformer and the secondary current transformer equal. Based on the electricity amount of the same level, the transformer protecting relay determines whether an accident has occurred or not.

However, the conventional transformer protecting relay may have the following problem. When the voltage ratio and the current ratio (transformation ratio) have been incorrectly set due to a user's mistake, etc., the relay may malfunction.

SUMMARY OF THE INVENTION

Therefore, an aspect of the detailed description is to provide a relay and method for protecting a transformer capable of preventing a malfunction of a transformer by determining whether a transformation ratio of the transformer has been correctly set or not based on an inner algorithm, and a transformer protecting system having the same.

Another aspect of the detailed description is to provide a relay and method for protecting a transformer capable of re-setting a transformation ratio by determining whether a transformation ratio of a transformer has been correctly set or not based on an inner algorithm and by informing a result of the determination to a user, and a transformer protecting system having the same.

To achieve these and other advantages and in accordance with the purpose of this specification, as embodied and broadly described herein, there is provided a transformer protecting relay, the relay comprising: an input module configured to input a voltage ratio of a transformer and a current ratio between a primary current transformer and a secondary current transformer connected to the transformer; and a control module configured to determine whether the transformer has been correctly set or not based on the voltage ratio and the current ratio.

The transformer protecting relay may further comprise an output module configured to output a result of the determination to the outside.

The control module may be configured to determine that the transformer has been incorrectly set if a value obtained by multiplying the voltage ratio by the current ratio is out of a predetermined range.

To achieve these and other advantages and in accordance with the purpose of this specification, as embodied and broadly described herein, there is also provided a transformer protecting method using a transformer protecting relay, the method comprising: receiving a voltage ratio of a transformer, and a current ratio between a primary current transformer and a secondary current transformer connected to the transformer; and determining whether the transformer has been correctly set or not based on the voltage ratio and the current ratio.

The method may further comprise outputting a result of the determination to the outside.

The step of determining whether the transformer has been correctly set or not may include comparing a value obtained by multiplying the voltage ratio by the current ratio with a predetermined range; determining that the transformer has been correctly set if the value is within the predetermined range as a result of the comparison; and determining that the transformer has been incorrectly set if the value is out of the predetermined range as a result of the comparison.

To achieve these and other advantages and in accordance with the purpose of this specification, as embodied and broadly described herein, there is still also provided a transformer protecting system, comprising: a transformer having a predetermined voltage ratio, and configured to convert a voltage of an input side power unit and to supply the converted voltage to an output side power unit; a primary current transformer and a secondary current transformer connected to an input side and an output side of the transformer, respectively; a user's setting receiving unit configured to receive the voltage ratio of the transformer and the current ratio between the primary current transformer and the secondary current transformer; and a relay configured to determine whether the transformer has been correctly set or not by a user based on the voltage ratio and the current ratio.

The transformer protecting system may further comprise an input side switch provided at the transformer and the primary current transformer, and configured to disconnect the transformer and the primary current transformer from each other according to a disconnection signal; and an output side switch provided at the transformer and the secondary current transformer, and configured to disconnect the transformer and the secondary current transformer from each other according to a disconnection signal. The relay may be configured to inform a result of the determination to the outside, and to generate the disconnection signal.

In the present disclosure, a system accident due to a user's mistake may be prevented. This may enhance a system stability.

In the present disclosure, whether a transformation ratio of the transformer has been correctly set or not by a user, etc. may be determined in advance, based on an inner algorithm. This may prevent a malfunction of the relay when the system is operated.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a relay and method for protecting a transformer, and a transformer protecting system having the same will be explained in more details with reference to the attached drawings.

Figure 1:
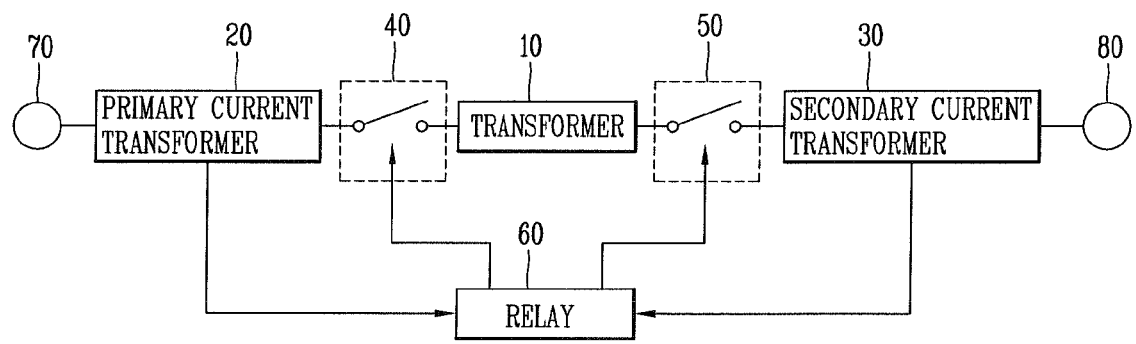
FIG. 1 is a view for explaining a transformer protecting system according to the present disclosure.

Referring to FIG. 1, a transformer protecting system according to the present disclosure comprises a transformer 10 having a predetermined voltage ratio, and configured to convert a voltage of an input side power unit and to supply the converted voltage to an output side power unit; a primary current transformer 20 and a secondary current transformer 30 connected to an input side and an output side of the transformer, respectively; a user's setting receiving unit (not shown) configured to receive the voltage ratio of the transformer and the current ratio between the primary current transformer and the secondary current transformer; and a relay 60 configured to determine whether the transformer has been correctly set or not by a user, based on the voltage ratio and the current ratio.

The transformer protecting system may further comprise an input side switch 40 provided at the transformer 10 and the primary current transformer 20, and configured to disconnect the transformer 10 and the primary current transformer 20 from each other according to a disconnection signal.

The transformer protecting system may further comprise an output side switch 50 provided at the transformer 10 and the secondary current transformer 30, and configured to disconnect the transformer 10 and the secondary current transformer 30 from each other according to a disconnection signal.

The relay 60 may be configured to inform a result of the determination to the outside, and to generate the disconnection signal.

In the occurrence of an error of the transformer 10, the relay 60 generates a disconnection signal to the input side switch 40 and the output side switch 50. For instance, if a ground fault has occurred on the transformer, current values of two ends of the transformer become greatly different from each other. This may cause a differential current between an input current and an output current of the relay 60, or a phase difference between an input current and an output current of the relay 60.

Once the differential current or phase difference occurs, the relay 60 determines that an error has occurred, and transmits a disconnection signal to the input side switch 40 and the output side switch 50.

Figure 4:
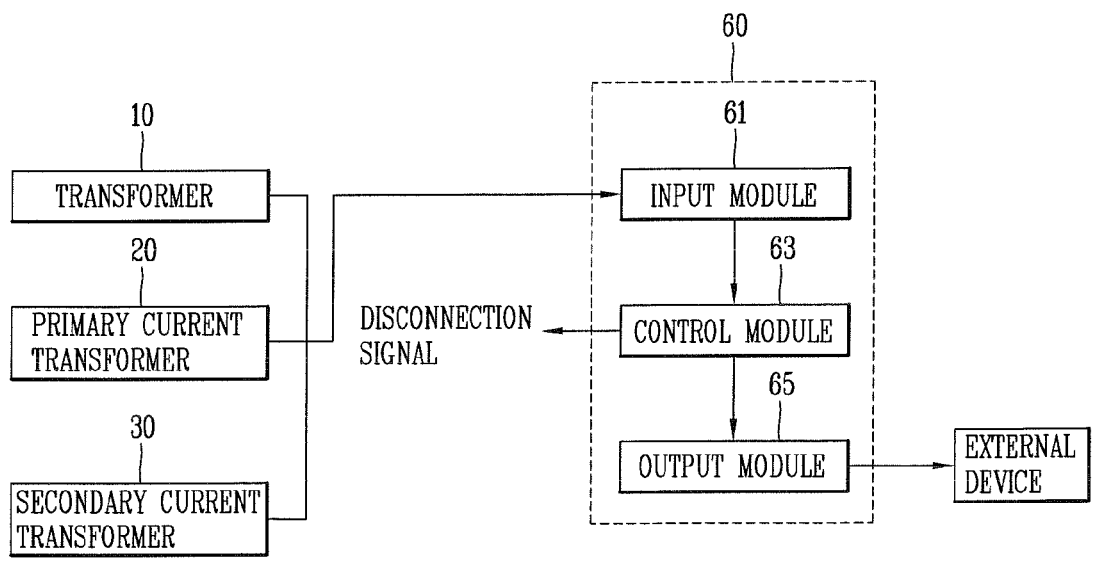
FIG. 4 is a block diagram schematically showing a configuration of a transformer protecting system according to the present disclosure.

Referring to FIG. 4, the transformer protecting relay 60 comprises an input module 61 configured to input a voltage ratio of a transformer and a current ratio between a primary current transformer and a secondary current transformer connected to the transformer, and a control module 63 configured to determine whether the transformer has been correctly set or not based on the voltage ratio and the current ratio.

The transformer protecting relay 60 may further comprise an output module 65 configured to output a result of the determination to the outside.

The input module 61 may be configured to allow a user to directly input the voltage ratio and the current ratio, or configured to read a transformation ratio set by a user by being connected to the transformer 10, the primary current transformer 20 and the secondary current transformer 30.

The control module 63 is configured to store therein an inner algorithm, and to verify a transformation ratio set by a user, etc. based on the inner algorithm. More concretely, the control module 63 may be configured to determine that the transformer has been incorrectly set if a value obtained by multiplying the voltage ratio by the current ratio is out of a predetermined range based on the inner algorithm.

An electricity amount (power) of the transformer 10 may be preferably expressed by the following formula 1 with respect to the primary and secondary sides.

$$V_1 \times I_1 = V_2 \times I_2 \quad \text{[Formula 1]}$$

($V_1$ is a primary voltage, $V_2$ is a secondary voltage, $I_1$ is a primary current, and $I_2$ is a secondary current.)

As can be seen from the formula 1, if the primary voltage and the secondary voltage are proportional to each other, the primary current and the secondary current are inversely proportional to each other. More concretely, in case of a step-down transformer where a secondary voltage is lower than a primary voltage, a secondary current becomes high to cause a current ratio to become great. On the other hand, in case of a step-up transformer where a secondary voltage is higher than a primary voltage, a secondary current becomes low to cause a current ratio to become small.

The control module 63 calculates a value of 'K' based on the following formula 2, and determines that the transformer has been incorrectly set if the value of 'K' is out of a predetermined range based on '1'.

$$\frac{V_1 \times I_1}{V_2 \times I_2} = K \quad \text{[Formula 2]}$$

(K is a constant, $V_1$ is a primary voltage, $V_2$ is a secondary voltage, $I_1$ is a primary current, and $I_2$ is a secondary current.)

The formula 2 may be derived from the formula 1, and the value of 'K' may have a value of '1', theoretically. Whether the transformer has been correctly set or not may be determined based on the value of 'K' calculated by the voltage ratio and the current ratio set by a user.

Figure 2:
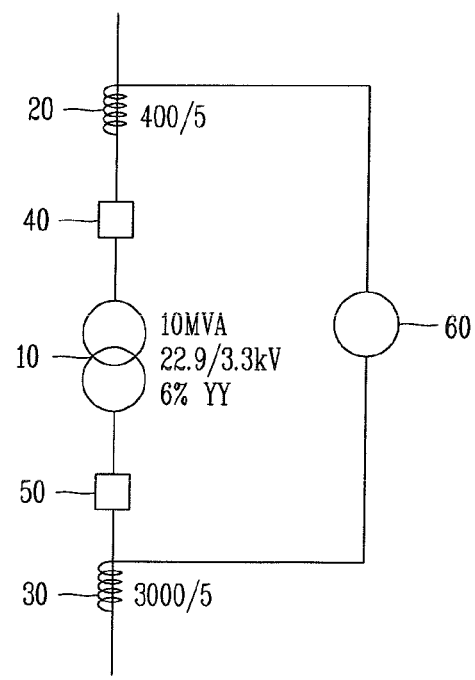
FIGS. 2 and 3 are views for explaining an operation of a transformer protecting relay according to the present disclosure.
Figure 3:
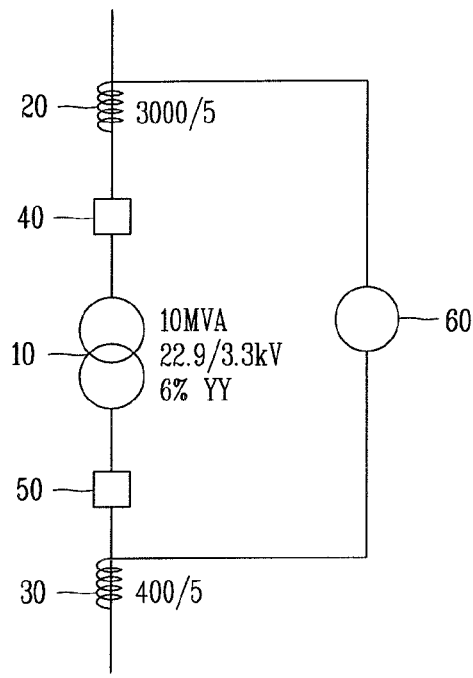

Referring to FIGS. 2 and 3, will be explained an operation of the transformer protecting relay according to the present disclosure.

Referring to FIG. 2, it is assumed, by a user's setting, that a primary current transformer has 22.9 [kV], a secondary current transformer has 3.3 [kV], a primary current transformer has 400 [A], and a secondary current transformer has 3000 [A].

In this case, the value of 'K' obtained based on the formula 2 is (22900×400)/(3300×3000)=0.925.

Referring to FIG. 3, it is assumed, by a user's setting, that a primary current transformer has 22.9 [kV], a secondary current transformer has 3.3 [kV], a primary current transformer has 3000 [A], and a secondary current transformer has 400 [A].

In this case, the value of 'K' obtained based on the formula 2 is very great as (22900×3000)/(3300×400)=52.045.

The control module 61 presets a predetermined range of the value of 'K', e.g., 0.8~1.2, and determines whether the calculated value of 'K' is within the predetermined range. If the value of 'K' is out of the predetermined range, the output module 65 informs, through an external device, that the transformer has been incorrectly set, and requires a user to re-set the predetermined range of the value of 'K'. Here, the external device may be a video device such as an LED or an LCD, or a display device, or an audio device such as an alarm and a beep. The output module 65 outputs, to the external device, a message indicating that the transformer has been incorrectly set, in the form of a signal.

Figure 5:
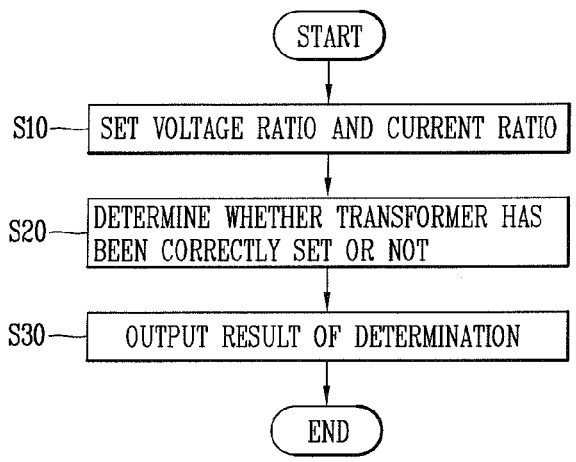
FIGS. 5 and 6 are views schematically showing a transformer protecting method according to the present disclosure.

Referring to FIG. 5, a transformer protecting method using a transformer protecting relay according to the present disclosure comprises a step of receiving a voltage ratio of a transformer, and a current ratio between a primary current transformer and a secondary current transformer connected to the transformer (S10), and a step of determining whether the transformer has been correctly set or not based on the voltage ratio and the current ratio (S20).

The method further comprises a step of outputting a result of the determination to the outside (S30).

Figure 6:
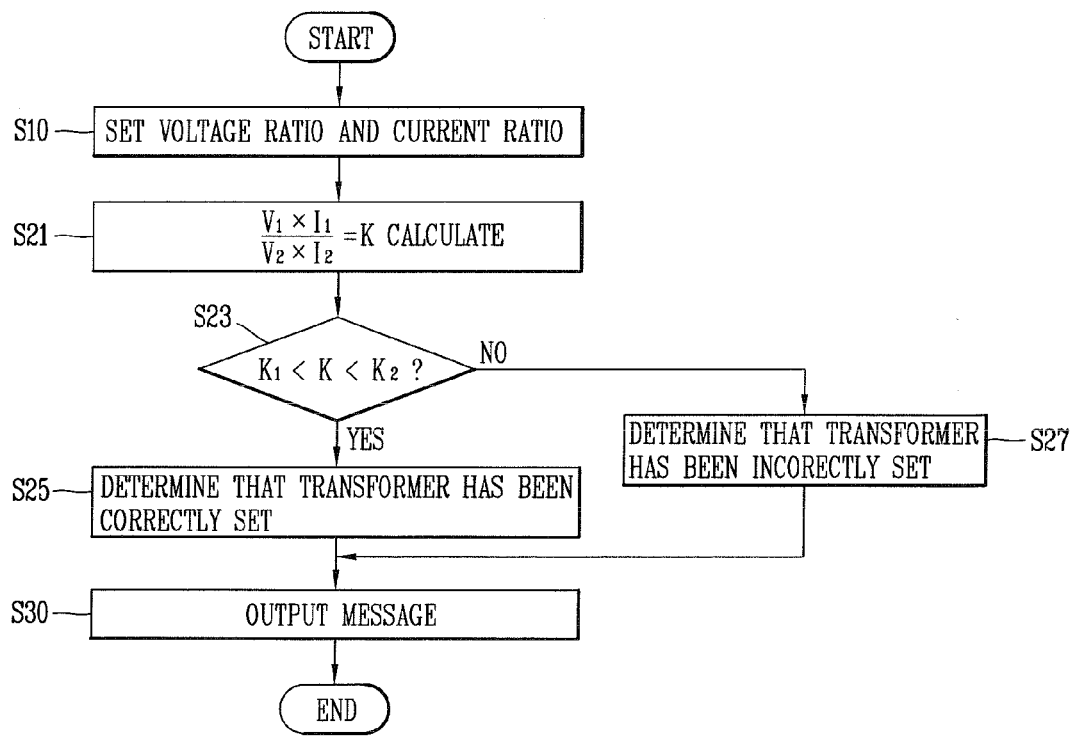

Referring to FIG. 6, the step of determining whether the transformer has been correctly set or not (S20) includes comparing a value obtained by multiplying the voltage ratio by the current ratio with a predetermined range (S23), determining that the transformer has been correctly set if the value is within the predetermined range as a result of the comparison (S25), and determining that the transformer has been incorrectly set if the value is out of the predetermined range as a result of the comparison (S27). A configuration of an apparatus will be understood with reference to FIGS. 1 to 4.

An electricity amount (power) of the transformer may be preferably expressed by the formula 1 with respect to the primary and secondary sides. As can be seen from the formula 1, if the primary voltage and the secondary voltage are proportional to each other, the primary current and the secondary current are inversely proportional to each other.

The transformer protecting relay 60 calculates a value of 'K' based on the formula 2, and determines that the transformer has been incorrectly set if the calculated value of 'K' is out of a predetermined range based on '1'. The formula 2 may be derived from the formula 1, and the value of 'K' may have a value of '1', theoretically. Whether the transformer has been correctly set or not may be determined based on the value of 'K' calculated by the voltage ratio and the current ratio set by a user.

The transformer protecting relay 60 presets a predetermined range of the value of 'K', e.g., 0.8(K1)~1.2(K2), and determines whether the calculated value of 'K' is within the predetermined range. If the value of 'K' is out of the predetermined range, the transformer protecting relay 60 informs a user through a warning message outputted to an output screen. More concretely, as shown in FIG. 3, it is assumed, by a user's setting, that a primary current transformer has 22.9 [kV], a secondary current transformer has 3.3 [kV], a primary current transformer has 3000 [A], and a secondary current transformer has 400 [A]. In this case, the value of 'K' obtained based on the formula 2 is very great as (22900×3000)/(3300× 400)=52.045. The transformer protecting relay 60 may output a warning message to an LED or an LCD, or may generate a warning sound through an alarm or a beep.

As aforementioned, in the present disclosure, whether a transformation ratio of the transformer has been correctly set or not may be determined based on an inner algorithm. If it is determined that the transformation ratio has been incorrectly set, a user may be informed to reset the transformation ratio. This may prevent a malfunction of the relay when the system is operated, and may enhance a system stability.

What is claimed is:

1. A transformer protecting relay comprising:
an input module configured to allow a user to input a voltage ratio of the transformer and a current ratio between the primary current transformer and the secondary current transformer; and
a control module configured to:
calculate a ratio value K according to a formula:

$$\frac{V_1 \times I_1}{V_2 \times I_2} = K,$$

wherein $V_1$ is a primary voltage, $V_2$ is a secondary voltage, $I_1$ is a primary current, and $I_2$ is a secondary current; and
determine whether the transformer has been incorrectly set before the transformer is operated by determining if K is out of a predetermined range.

2. The relay of claim 1, wherein the predetermined range is 0.8 to 1.2.

3. The relay of claim 1, further comprising an output module configured to output a result of the determination to a user if K is out of the predetermined range.

4. The transformer protecting relay of claim 1, wherein the input module is further configured to allow a user to input a transformation ratio value.

5. A transformer protecting method using a transformer protecting relay, the method comprising:
receiving a user input comprising a voltage ratio of a transformer and a current ratio between a primary current transformer and a secondary current transformer connected to the transformer;
calculating a ratio value K according to a formula:

$$\frac{V_1 \times I_1}{V_2 \times I_2} = K,$$

wherein $V_1$ is a primary voltage, $V_2$ is a secondary voltage, $I_1$ is a primary current, and $I_2$ is a secondary current;
comparing K to a predetermined range; and
determining that the transformer has been incorrectly set before the transformer is operated if K is out of the predetermined range.

6. The method of claim 5, wherein the predetermined range is 0.8 to 1.2.

7. The method of claim 5, further comprising outputting a result of the determination to a user if the transformer has been incorrectly set.

8. A transformer protecting system, comprising:

a transformer having a predetermined voltage ratio, the transformer configured to convert a voltage of an input side power unit and to supply the converted voltage to an output side power unit;

a primary current transformer connected to an input side of the transformer;

a secondary current transformer connected to an output side of the transformer;

a receiving unit configured to receive a user input comprising the voltage ratio of the transformer and the current ratio between the primary current transformer and the secondary current transformer;

a relay comprising a control module, the control module configured to determine whether the transformer has been incorrectly set before the transformer is operated based on the user input;

calculate a ratio value K according to a formula:

$$\frac{V_1 \times I_1}{V_2 \times I_2} = K,$$

wherein $V_1$ is a primary voltage, $V_2$ is a secondary voltage, $I_1$ is a primary current, and $I_2$ is a secondary current; and compare the calculated value of K with a predetermined range; and cause the relay to output a signal that the transformer has been incorrectly set before the transformer is operated if the value of K is out of the predetermined range.

9. The transformer protecting system of claim 8, further comprising a first switch provided at a first side of the transformer and configured to disconnect the transformer and the primary current transformer from each other according to a disconnection signal.

10. The transformer protecting system of claim 9, further comprising a second switch provided at a second side of the transformer and configured to disconnect the transformer and the secondary current transformer from each other according to a disconnection signal.

11. The transformer protecting system of claim 10, wherein the control module is further configured to generate the disconnection signal.

12. The transformer protecting system of claim 8, wherein the control module is further configured to cause the relay to output a result of the determination to a user if K is out of the predetermined range.

* * * * *